United States Patent Office 3,342,586
Patented Sept. 19, 1967

3,342,586
PROCESS OF KILLING WEEDS EMPLOYING ACYLATED UREA DERIVATIVES
Jean Lehureau and Pierre Poignant, Saint-Rambert-l'Ile-Barbe, France, assignors to Societe Progil, Paris, France
No Drawing. Filed Mar. 6, 1963, Ser. No. 263,138
Claims priority, application France, Mar. 8, 1962, 890,397
8 Claims. (Cl. 71—120)

The present invention relates to new herbicides and more generally to a new group of urea derivatives endowed with interesting herbicidal properties.

It is known that ureas of which one or more hydrogen atoms are substituted by alkyl, alkoxy or aryl groups, or participate in pairs in a ring or a heterocycle, can be used in agriculture as weed-killers. Nevertheless, these substances are not always sufficiently active and frequently leave much to be desired when a very selective weed-killing action is necessary.

The present invention amplifies the range of substances available to agriculture, and greatly increases the possible choice of effective herbicides which are required for the different particular cases which can arise in various types of cultivation. The invention covers, in effect, a new group of derivatives of urea which are capable of acting as weed-killers, agents for clearing undergrowth, arboricides and growth-control agents, the use of which has remarkable flexibility and leads to extremely varied possibilities of application.

The new industrial products according to the invention, which are substituted ureas or polyureas, in which at least one hydrogen atom is replaced by a carbonyl group CO—, can be represented by the following general formulae:

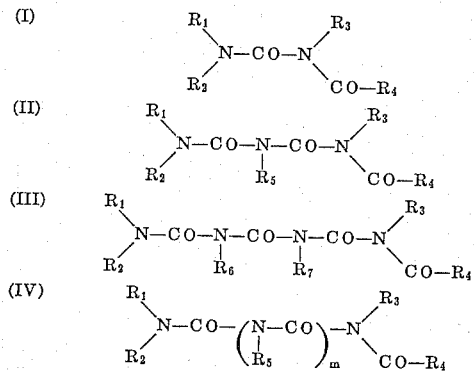

in which:

$R_1$, $R_2$, $R_3$, $R_5$, $R_6$ and $R_7$ are identical or different and can represent: H, or alkyl, alkoxy, cycloalkyl, aryl, or aralkyl radicals which are possibly substituted, particularly by electronegative atoms or groupings, as for example halogen, an $NO_2$, alkyl and/or alkoxy group; in addition, at least one of these radicals can be of the —CO—$R_4$ type, and certain of these radicals can participate in pairs in a cycle or heterocycle. At least one of radicals $R_1$, $R_2$ and $R_3$ is other than hydrogen.

$R_4$ represents an aryl, aralkyl, or heterocyclic radical, or even a radical of the type:

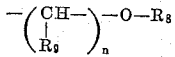

$R_8$ having the same meaning as $R_4$; $R_9$ represents a hydrogen or an alkyl radical and $n$ is an integer from 1 to 5. $m$ is zero or an integer from 1 to 5.

Among the substituted ureas according to the invention, those which are particularly suitable as herbicides can be represented by the following formula, which is more restricted than the foregoing:

(V)  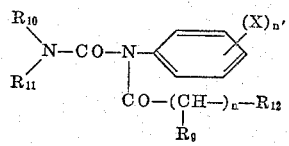

in which:

$R_9$, $R_{10}$ and $R_{11}$ are identical or different and can represent: a hydrogen atom or an alkyl or alkoxy radical containing 1 to 5 carbon atoms, $R_{12}$ represents an aryl or aryloxy radical and can comprise one or more substituents selected from the halogens or groups such as alkyl, alkoxy, nitro groups, X represents a halogen, an $NO_2$ group, an alkyl or/and an alkoxy group.

$n$ has the same meaning as above, while $n'$ is an integer from 0 to 5, and preferably from 1 to 3.

The following compounds belonging to the Formula V may be referred to as non-limitative examples:

N-phenylacetyl-N-phenyl-N',N'-dimethyl urea
N-phenylacetyl-N-(3,4-dichlorophenyl)-N',N'-dimethyl urea
N-phenylacetyl-N-(3,4-dichlorophenyl)-N'-butyl-N'-methyl urea
N-(2,3,6-trichlorophenylacetyl)-N-(4-chlorophenyl)-N',N'-dimethyl urea
N-phenylacetyl-N-(3,4-dichlorophenyl)-N'-methoxy-N'-methyl urea
N-phenylacetyl-N-(3-nitrophenyl)-N'-methyl urea
N-(2,6-dichlorophenylacetyl)-N-(3-nitro-4-chlorophenyl)-N',N'-dimethyl urea
N-phenylacetyl-N-(3-chloro-4-methoxyphenyl)-N'-ethyl-N'-methyl urea
N-phenylacetyl-N-(3-nitro-4-methylphenyl)-N',N'-dimethyl urea
N-phenylacetyl-N-(3,4-dichlorophenyl)-N'-methoxy urea
N-(2-methyl-3,6-dichlorophenylacetyl)-N-(3-bromo-4-ethoxyphenyl)-N',N'-dimethyl urea
N-phenylpropionyl-N-(3,4-dichlorophenyl)-N',N'-dimethyl urea
N-phenoxyacetyl-N-phenyl-N',N'-dimethyl urea
N-phenoxyacetyl-N-(4-chlorophenyl)-N',N'-dimethyl urea
N-phenoxyacetyl-N-(3,4-dichlorophenyl)-N,N'-dimethyl urea
N-phenoxyacetyl-N-(3-nitro-4-chlorophenyl)-N',N'-dimethyl urea
N-phenoxyacetyl-N-(3-nitrophenyl)-N'-ethyl-N'-methyl urea
N-phenoxyacetyl-N-(3-nitro-4-methoxyphenyl)-N',N'-dimethyl urea
N-phenoxyacetyl-N-phenyl-N'-butyl-N'-methyl urea
N-phenoxyacetyl-N-(4-fluorophenyl)-N'-ethyl-N'-methyl urea
N-phenoxyacetyl-N-(3,4-dichlorophenyl)-N'-methoxy-N'-methyl urea
N-(4-chlorophenoxyacetyl)-N-(4-chlorophenyl)-N',N'-dimethyl urea
N-(2,4-dichlorophenoxyacetyl)-N-(3,4-dichlorophenyl)-N',N'-dimethyl urea N-(2,4-dichlorophenoxyacetyl)-N-(3-nitrophenyl)-N'-ethyl-N'-methyl urea N-(2,4-dichlorophenoxyacetyl)-N-(3,4-dichlorophenyl)-N'-methoxy-N'-methyl urea N-(2,4-dichlorophenoxyacetyl)-N-(3-chloro-4-methoxy)-N'-butyl-N'-methyl urea N-(2-methyl-4-chlorophenoxyacetyl)-N-(4-chlorophenyl)-N',N'-dimethyl urea N-(2,5-dichlorophenoxyacetyl)-N-(3,4-dichlorophenyl)-N'-methoxy-N'-methyl urea N-(2,4-dichloro-5-methylphenoxyacetyl)-N-(4-chlorophenyl)-N',N'-dimethyl urea N-(2-chloro-4,5-difluorophenoxyacetyl)-N-(3,4-dichlorophenyl)-N',N'-dimethyl urea N-(4-nitrophenoxyacetyl)-N-(4-chlorophenyl)-N',N'-dimethyl urea N-(2-4-dichloro-5-nitrophenoxyacetyl)-N-(3,4-dichlorophenyl)-N'-methoxy-N'-methyl urea N-(2,4-dimethylphenoxyacetyl)-N-(3,4-dichlorophenyl)-N',N'-dimethyl urea N-(2-methoxy-4-chlorophenoxyacetyl)-N-(3,4-dichlorophenyl)-N',N'-dimethyl urea N-(2,4,5-trichlorophenoxyacetyl)-N-(4-chlorophenyl)-N',N'-dimethyl urea N-(2,4,5-trichlorophenoxyacetyl)-N-(3,4-dichlorophenyl)-N',N'-dimethyl urea N-(2-methyl-4-chlorophenoxyacetyl)-N-(3,4-dichlorophenyl)-N'-methyl-N'-n-propyl urea N-(2,4-dichlorophenoxy-α-methylacetyl)-N-(3,4-dichlorophenyl)-N',N'-dimethyl urea N-(2,4-dichlorophenoxy-α-methylacetyl)-N-(3,4-dichlorophenyl)-N'-methyl-N'-methoxy urea N-(2,4,5-trichlorophenoxy-α-methylacetyl)-N-(4-chlorophenyl)-N',N'-dimethyl urea N-(2,4-dichlorophenoxybutyryl)-N-(4-chlorophenyl)-N',N'-dimethyl urea N-(4-chlorophenoxybutyryl)-N-(3,4-dichlorophenyl)-N'-methyl-N'-ethyl urea N-(3-methoxy-4-chlorophenoxyacetyl)-N-(3,4-dichlorophenyl)-N',N'-dimethyl urea N-phenoxyacetyl-N-(3-nitrophenyl)-N',N'-dimethyl urea N-(2,4-dichlorophenoxyacetyl)-N-(4-nitrophenyl)-N',N'-dimethyl urea N-(4-chlorophenoxyacetyl)-N-(2-nitrophenyl)-N',N'-dimethyl urea N-(1-naphthylacetyl)-N-(3,4-dichlorophenyl)-N',N'-dimethyl urea N-(2-naphthoxy-α-ethylacetyl)-N-(3,4-dichlorophenyl)-N',N'-dimethyl urea Such compounds are preferable to the known N(2,4-dichlorophenoxyacetyl) urea which derives from single urea by the substitution of one sole hydrogen atom.

The new products according to the invention can be used, depending on the nature and the selected quantity of the compound, either as complete weed-killers for destroying the existing vegetation or preventing it from becoming established, or as selective weed-killers for combatting weeds or even as a specific weed-killer, it being possible for the weeds to be destroyed without harming an adjacent cultivated plant at a time when both are at identical stages of germination, growth or development. In addition, a large number of these new substituted ureas are capable of inhibiting the shooting of weeds for several weeks to several months, depending on the chemical nature and the quantity of the compounds employed; this persistence of the effectiveness constitutes an important advantage by practically preventing the concurrence of weeds throughout the entire cultivation period.

An important advantage of the invention is that there are, among the new substituted ureas, numerous compounds soluble in usual organic solvents; that allows one to use them in the form of solutions in organic solvents or as aqueous emulsions of the oil-in-water or water-in-oil types, or even as aqueous and/or organic suspensions, powders, granules or tablets, after eventually adding adequate ingredients.

A very surprising property of ureas according to the invention is that, when adequately chosen, they are capable of destroying certain undesirable dicotyledons while letting unaffected adjacent cultivated plants which are also dicotyledons; similarly undesirable graminaceous weeds may be killed in the presence of cultivated graminaceous plants, without injury to the latter, as for example in the case of cereals such as wheat, corn, barley, oat, etc.

The doses of active substance to be used can vary within wide limits, particularly between 0.5 kg. and 50 kg. per hectare, depending on the desired object, the type of application, the nature of the plants to be destroyed and their state of growth and also the persistence of the desired herbicidal action.

The herbicides according to the invention can be employed either alone or in conjunction with adjuvants which may be neutral with respect to the plants or have a more or less toxic action in themselves. Such adjuvants can be solid products, such as for example alkali chlorides or borates, liquids derived from coal tar (creosote), simple or substituted phenols, derivatives of petroleum, such as kerosene, gas oil, fuel oils, etc. In the case where the application is effected in the form of a powder or granules, it may be recommendable to use supports which are partly or entirely formed of fertilizing materials containing macroelements such as potassium, phosphoric acid, etc., and possibly trace elements such as zinc, iron, manganese, copper, cobalt, magnesium, etc. These adjuvants and these fertilizers can in certain cases be accompanied by manures, particularly those which generate nitrogen, which frequently have the effect of increasing the herbicidal efficacy of the substituted urea.

In addition, and according to another characteristic feature of the invention, the new substituted ureas of the Formulas I to V as referred to above can be associated with one or more known herbicides as well as with the aforesaid agents. Their efficacy as weed-killers can thus be increased either by the fact of a synergy due to the association of two or more active materials or simply by the fact of obtaining a polyvalence which increases the spectrum of herbicidal activity.

Thus, it is for example possible to add one or more of prior known active products to the herbicide or mixture of herbicides according to the invention, these products being for example: nitrated phenols or simultaneously nitrated and chlorinated phenols; aryl oxyalkyl carboxylic acids which are halogenated on the nucleus; polyhalogenated benzoic, alkyl-carboxylic or phenyl-alkyl-carboxylic acids or their derivatives, such as salts, esters, amides, imides; monohalogenated or polyhalogenated carbamates, thiocarbamates or thiolcarbamates; monosubstituted or disubstituted amides; monosubstituted or polysubstituted ureas which possibly contain halogens; substituted triazines, hydrazides, quaternary ammonium, etc.; or even various mineral herbicides such as bichromates, chlorates, borates, alkali cyanates, etc.

The following specific compounds, useful in association with the new herbicides of the invention, are indicated by way of non limitative examples:

Polynitrophenols, polynitrocresols, polynitro-alkylphenols, nitrochlorophenols, mono- and poly-chlorophenols and chlorocresols;

2-4-dichlorophenoxyacetic acid, 2-(2-4-dichlorophenoxy) propionic acid, 4-(2-methyl-4-chlorophenoxy) butyric acid, 2,3,6-trichlorobenzoic acid, 3-amino-2,5-dichlorobenzoic acid, 2-methoxy-3,5-dichlorobenzoic acid, Polychloro-phenylacetic acids, monochloroacetic or/and trichloroacetic acid, 2-chloro-N-N-diallyl acetamide,
Isopropyl-N-phenyl carbamate,
Butynol-N-(3-chlorophenyl) carbamate,
4-chloro-2-butynyl N-(3-chlorophenyl) carbamate,
2-chloroallyl-N',N'-diethyl dithiocarbamate,
Ethyl-N,N-dipropylthiolcarbamate,
Propyl N-ethyl-N-n-butyl thiolcarbamate,
2,3,3-trichloro allyl-di-isopropylthiolcarbamate,
N-crotonyl anilide, N-(3,4-dichlorophenyl) propanamide,
N-(3,4-dichlorophenyl) methacrylamide,
N,N-di-n-propyl trifluoro-p-toluidine,
N,N-dimethyl-2,2-diphenylacetamide,
N-cyclo-octyl-N',N'-dimethyl urea,
N-phenyl-N',N'-dimethyl urea,
N-(3,4-dichlorophenyl)-N',N'-dimethyl urea,
2-chloro-4,6-bis-ethylamino-S-triazine,
2-chloro-4,6-bis-isopropylamino-1,3,5-triazine,
2-chloro-4-ethylamino-6 isopropylamino-1,3,5-triazine,
2-methoxy-4,6-bis-ethylamino-S-triazine,
3-amino-1,2,4-triazole,
2,6-dichlorobenzonitrile,
1,1'-ethylene-2,2'-dipyridylium dibromide,
Maleic hydrazide.

The new products according to the invention can be prepared by using generally known methods for obtaining substituted derivatives of urea, as for example: reaction of an arylacyl amide or an aryloxy amide in which the hydrogen atom bonded to the nitrogen is possibly substituted by an organic hydrocarbon radical with either phosgene or a carbamyl halide (preferably the chloride) or even an isocyanate. It is also possible to prepare products according to the invention by the action of the chloride of an aryl-acylated acid or of an aryl-oxyacylated acid on a diurea or triurea which is possibly substituted but still containing at least one hydrogen atom on at least one of the nitrogen atoms.

The following examples, which are not limitative in any way, show how the invention may be carried into effect.

The examples numbered 1 to 25 on the following two pages, in the form of tables, give the contents in chlorine and nitrogen, as well as the melting points of a series of ureas according to the invention.

The examples numbered 26 to 33 describe the preparation and the characteristics of some of the products according to the invention. Those numbered 34 to 42 illustrate some of the properties and possibilities of using a certain non-limitative number of the new substituted ureas according to the invention by tests carried out in the field under the same conditions which obtain in practice.

| No. | Chlorine | | Nitrogen | | Melting Point, °C. |
|---|---|---|---|---|---|
| | Calculated | Found | Calculated | Found | |
| 1 | 0 | ---- | 13.4 | 13.3 | 143 |
| 2 | 0 | ---- | 7.8 | 7.3 | 129 |
| 3 | 19.3 | 19.3 | 7.6 | 7.8 | 95 |
| 4 | 26.5 | 26.1 | 6.1 | 6.9 | 119 |
| 5 | 32.5 | 32.3 | 6.4 | 6.2 | 128 |
| 6 | 31.4 | 32.4 | 6.2 | 6.4 | ---- |
| 7 | 35.75 | ---- | 9.51 | ---- | 196 |
| 8 | 34.2 | 34.6 | 8.95 | 8.5 | 229 |
| 9 | 32.7 | 31.7 | 8.6 | 8.5 | 178 |
| 10 | 32.7 | 33.1 | 8.6 | 9.9 | 157 |
| 11 | 33.6 | 35.2 | 6.6 | 6.4 | 179 |
| 12 | 34.8 | 34.8 | 6.8 | 6.8 | 215 |
| 13 | 24.3 | 23.7 | 6.4 | 6.3 | 189 |
| 14 | ---- | ---- | ---- | ---- | 226 |
| 15 | 34.3 | 35 | 5.4 | 5.3 | 198 |
| 16 | 37.7 | 37.7 | 6.95 | 6.4 | 145 |
| 17 | 38.5 | 38.1 | 4.3 | 4.6 | 201 |
| 18 | 32.5 | ---- | 6.4 | ---- | ---- |
| 19 | 37.7 | 37.1 | 5.95 | 6.3 | 136 |
| 20 | ---- | ---- | ---- | ---- | 87 |
| 21 | 31.5 | 32.5 | 6.2 | 6.1 | 121 |
| 22 | 36.6 | 36.1 | 5.8 | 5.3 | 130 |
| 23 | ---- | ---- | 14.45 | 14.5 | 190 |
| 24 | ---- | ---- | ---- | ---- | ---- |
| 25 | ---- | ---- | ---- | ---- | 129 |

Example 26

One mol of phosgene is caused to react at 60° C. in an inert solvent on two mols of 2,4,5-trichlorophenoxyacetamide in the presence of pyridine. After filtering the pyridine hydrochloride which is formed, a white crystalline product is obtained by recrystallisation, which melts at 93° C. and the analysis of which confirms the structure of bis-(2,4,5-trichlorophenoxyacetyl) urea. This substance has excellent properties as a multi-purpose weed-killing agent.

Example 27

One mol of N-(3,4-dichlorophenyl)-N',N'-dimethyl urea is caused to react at 80° C. in an inert solvent on one mol of 2,4,5-trichlorophenoxyacetyl chloride in the presence of pyridine. A white crystalline product melting at 145° C. is obtained, the analysis of which confirms the structure of N-(2,4,5-trichlorophenoxyacetyl)-N-(3,4-dichlorophenyl)-N',N'-dimethyl urea.

Example 28

The procedure of Example 27 is followed, but replacing the 2,4,5-trichlorophenoxyacetyl chloride by 2,4-dichlorophenoxyacetyl chloride. A white crystalline product is obtained which melts at 128° C., the analysis of which confirms the structure of N-(2,4-dichlorophenoxyacetyl)-N-(3,4-dichlorophenyl)-N',N'-dimethyl urea. The product, like that obtained in Example 27, is very suitable for the selective cleaning of cereals.

| No. | $R_4$—CO | $R_2$ | $R_3$ | $R_1$ |
|---|---|---|---|---|
| 1 | $C_6H_5OCH_2CO$— | H | $CH_3$— | H |
| 2 | $C_6H_5OCH_2CO$— | $CH_3$— | $C_6H_5$— | $C_6H_5$— |
| 3 | $C_6H_5OCH_2CO$— | 3,4—$Cl_2C_6H_3$— | $CH_3$— | $CH_3$— |
| 4 | 2,4—$Cl_2C_6H_3OCH_2CO$— | 4—$ClC_6H_4$— | $CH_3$— | $CH_3$— |
| 5 | 2,4—$Cl_2C_6H_3OCH_2CO$— | 3,4—$Cl_2C_6H_3$— | $CH_3$— | $CH_3$— |
| 6 | 2,4—$Cl_2C_6H_3OCH_2CO$— | 3,4—$Cl_2C_6H_3$— | $CH_3O$— | $CH_3$— |
| 7 | 2,4,5—$Cl_3C_6H_2OCH_2CO$— | H | H | H |
| 8 | 2,4,5—$Cl_3C_6H_2OCH_2CO$— | H | $CH_3$— | H |
| 9 | 2,4,5—$Cl_3C_6H_2OCH_2CO$— | H | $CH_3$— | $CH_3$— |
| 10 | 2,4,5—$Cl_3C_6H_2OCH_2CO$— | $CH_3$— | $CH_3$— | H |
| 11 | 2,4,5—$Cl_3C_6H_2OCH_2CO$— | $CH_3$— | 4—$ClC_6H_4$— | H |
| 12 | 2,4,5—$Cl_3C_6H_2OCH_2CO$— | H | 4—$ClC_6H_4$— | H |
| 13 | 2,4,5—$Cl_3C_6H_2OCH_3CO$— | $CH_3$— | $C_{10}H_7$— | H |
| 14 | 2,4,5—$Cl_3C_6H_2OCH_2CO$— | $C_{10}H_7$— | $CH_3$— | H |
| 15 | 2,4,5—$Cl_3C_6H_2OCH_2CO$— | 4—$ClC_6H_4$— | 4—$ClC_6H_4$— | H |
| 16 | 2,4,5—$Cl_3C_6H_2OCH_2CO$— | 3,4—$Cl_2C_6H_3$— | $CH_3$— | $CH_3$— |
| 17 | 2,4,5—$Cl_3C_6H_2OCH_2CO$— | 2,4,5—$Cl_3C_6H_2OCH_2CO$— | 4—$ClC_6H_4$— | H |
| 18 | 2,4,6—$Cl_3C_6H_2OCH_2CO$— | 4—$ClC_6H_4$— | $CH_3$— | $CH_3$— |
| 19 | 2,4,6—$Cl_3C_6H_2OCH_2CO$— | 3,4—$Cl_2C_6H_3$— | $CH_3$— | $CH_3$— |
| 20 | 2—$CH_3C_6H_4OCH(CH_3)CO$— | 3,4—$Cl_2C_6H_3$— | $CH_3$— | $CH_3$— |
| 21 | 2,4—$Cl_2C_6H_3OCH(CH_3)CO$— | 3,4—$Cl_2C_6H_3$— | $CH_3$— | $CH_3$— |
| 22 | 2,4,5—$Cl_3C_6H_2OCH(CH_3)CO$— | 3,4—$Cl_2C_6H_3$— | $CH_3$— | $CH_3$— |
| 23 | $C_6H_5CH_2CO$— | H | $CH_3$— | H |
| 24 | $C_6H_5CH_2CO$— | 3,4—$Cl_2C_6H_3$— | $CH_3$— | $CH_3$— |
| 25 | $C_{10}H_7CH_2CO$— | 3,4—$Cl_2C_6H_3$— | $CH_3$— | $CH_3$— |

Example 29

Equal mols of 2,4-dichlorophenoxy-α-methylacetic acid chloride and N-(3,4-dichlorophenyl)-N',N'-dimethyl urea are caused to react between 85° and 90° C. in monochlorobenzene and in the presence of pyridine. After filtering the pyridine hydrochloride which is formed and evaporating the monochlorobenzene, the residual oil is recrystallised from ether. White crystals are obtained which melt at 120° C. and which represent N-(2,4-dichlorophenoxy-α-methylacetyl) - N - (3,4 - dichlorophenyl)-N',N'-dimethyl urea.

Example 30

One mol of phenoxyacetic acid chloride, 1 mol of N,N-diphenyl-N'-methyl urea and 500 cc. of monochlorobenzene are placed in a 1-litre flask equipped with a stirrer device, a reflux condenser, a thermometer and a dropping funnel. The temperature is raised to 70 to 80° C. and 1 mol of pyridine is added dropwise and the mixture is boiled under reflux. Boiling is maintained for 1 hour. Water is then added in order to dissolve the pyridine hydrochloride which has formed. The liquid is decanted and the organic phase is dried. The solvent is distilled under reduced pressure. The residual mass is crystallised in an appropriate solvent and there is thus obtained the N,N-diphenyl-N'-methyl-N'-phenoxyacetyl urea, M.P.=129° C.

Example 31

2,4,5-trichlorophenoxyacetamide is treated with a slight stoichiometric excess of 4-chlorophenyl isocyanate in monochlorobenzene medium at boiling point for 1 hour. The urea which forms precipitates by cooling. It is filtered and recrystallised from monochlorobenzene; the N-(2,4,5-trichlorophenoxyacetyl)-N'-(4-chlorophenyl) urea which is obtained melts at 215° C.

Example 32

The operations of Example 31 are repeated, but using secondary-bis-(2,4,5-trichlorophenoxyacetyl) amide in a nitrobenzene medium. The N,N-bis-(2,4,5-trichlorophenoxyacetyl) - N' - (4 - chlorophenyl) urea is obtained, this melting at 201° C.

Example 33

¼ mol of N-naphthyl-N'-methyl urea, ¼ mol of pyridine, ¼ mol of 2,4,5-trichlorophenoxyacetic acid chloride, dissolved in 800 cc. of perchlorethylene, are kept for 1 hour at 80° C. After cooling to 45° C., filtration is carried out to remove the pyridine hydrochloride. The substance is then cooled to 15° C. and the desired urea crystallises. After filtration followed by recrystallisation from methanol, the N - naphthyl - N' - (2,4,5-trichlorophenoxyacetyl)-N'-methyl urea is obtained, this substance melting at 189° C.

Example 34

A series of applications is carried out on plots of spring barley at the stage of one leaf and before appearance of the weeds, using each of the following substituted ureas in doses of respectively 2, 4, 6 and 8 kg. per hectare:

(a) N-(2,4-dichlorophenoxyacetyl)-N-(3,4-dichlorophenyl)-N',N'-dimethyl urea
(b) N-(2,4,5-trichlorophenoxyacetyl-N-(3,4-dichlorophenyl)-N',N'-dimethyl urea
(c) N-(2,4-dichlorophenoxy-α-methylacetyl)-N-(3,4-dichlorophenyl)-N',N'-dimethyl urea
(d) N-(2,4,5-trichlorophenoxy-α-methylacetyl)-N-(3,4-dichlorophenyl)-N',N'-dimethyl urea.

These active substances were used in the form of wettable powders containing, per 100 parts by weight:

50 parts of each the ureas
44 parts of kaolin
5 parts of Agrinol C.14 (registered trademark, product based on bisulphite cellulose)
1 part of Erganol AT.30 (registered trademark, product based on sodium alkylaryl sulphonate).

The treatments were carried out in the form of aqueous spraying of the suspensions obtained, distributing 600 litres of the spraying mixture to a hectare.

Studies of the flora of the weeds present in the comparison and treated plots were carried out 30, 60 and 90 days after the application, and also observations on the condition of the cereal.

The four ureas tested are perfectly selective up to the strongest dose which was tested, namely, 8 kg. per hectare.

The weeds such as annual dicotyledons, present in abundance in all the comparison plots, were between 90% and 100% destroyed by each of the substituted ureas at doses between 2 and 5 kg./hectare of active material: matricaria (Matricaria), chenopodia (Chenopodium sp.), charlock (Sinapis arvensis), wild radish (Raphanus raphanistrum) spotted persicaria (Polygonum persicaria), slender foxtail (Alopecurus agrestis), annual graminaceae, were limited in density and development by the derivative (a) and practically destroyed by the highest doses of derivative (c).

The persistence of the herbicidal activity is shown until the cereal is harvested.

Example 35

N-(2,4-dichlorophenoxyacetyl)-N-(3,4-dichlorophenyl)-N',N'-dimethyl urea was tested as ap re-emergence treatment on winter wheat, using the two following formulae:

A. The wettable powder previously described in Example 26.

B. A solution emulsifiable in water and containing, per litre:

20 g. of the substituted urea,
15 cc. of Soprophor CRI (registered trademark, polyethoxylated derivative of alkyl phenol and amine alkylaryl sulphonate)
67.3 cc. of cyclohexanone.

With all the doses tested, i.e. from 1 to 8 kg. per hectare of active substance, the two formulations are selective on wheat.

The emulsifiable solution has a slightly stronger herbicidal action than the wettable powder and ensures a destruction of the order of 80 to 100% of the following species of weeds, at quantities between 2.5 and 3 kg. per hectare: common cornflower (Centaurea cyanus), shepherd's purse (Capsella bursa pastoris), chenopodia (Chenopodium sp.), red poppies (Papaver sp.), matricaria (Matricaria sp.), cleavers (Galium aparine), common chickweed (Stellaria media), knotweed (Polygonum aviculaire) and climbing persicaria (Polygonum Convolvulus), corn spurrey (Spergula arvensis).

Example 36

N-phenoxyacetyl-N-(3,4-dichlorophenyl) - N',N' - dimethly urea was tested by a pre-emergence treatment in spray form on winter wheat and barley, using two formulations: wettable powder and a solution emulsifiable in water, and in quantities varying from 0.5 to 4 kg. of active substance per hectare.

The two formulations are completely selective on both wheat and barley up to 3 kg. of active substance per hectare and have a very weak inhibiting action in a quantity of 4 kg. per hectare. At the herbicidal level, the following species are attacked to between 80 and 100% when using quantities of active substance between 1 and 2 kg.

per hectare: parsely piert (*Alchemilla arvensis*), corn marigold (*Chrysanthenum segetum*), corn gromwell (*Lithospermum arvense*), nettles (*Lamium*), wild radish (*Raphanus raphanistrum*), and slender foxtail (*Alopecurus agrestis*).

*Example 37*

N-phenylacetyl-N-(3,4-dichlorophenyl)-N',N'-dimethyl urea was tested in a post-emergence treatment and in the form of a spray on maize at the stage of 5 to 7 leaves and overgrown with different species of weeds having in general 2 to 8 leaves. This active substance is employed in two formulations, namely, a wettable powder with 50% of active substance and an emulsifiable solution with 25% of active substance.

Both formulations are equally selective in the tested quantities varying from 1 to 4 kg. per hectare.

From the herbicidal point of view, the two formulations, with a slight advantage in favour of the emulsifiable solution, are capable of destroying or effectively limiting, in quantities between 2 and 4 kg. per hectare, the following species of weeds: chenopodia, mustards, wild radishes, amaranths (*Amarantus sp.*), annual mercury (*Mercurialis annua*), black-berried nightshade (*Solanum nigrum*), digitaria (*Digitaria sanguinalis*), and setaria (*Setaria sp.*).

*Example 38*

N-phenoxyacetyl-N-(3,4-dichlorophenyl) - N',N' - dimethyl urea is applied 5 days after planting out rice and before the emergence of panic grasses (*Panicum crus galli* and other Panicum), both in the form of a solution which can be emulsified in water and as granules with a basis of silica and bentonite. In the quantities tested, varying from 1 to 4 kg. per hectare, the formula in emulsion and the two types of granules are completely selective on rice.

Between 90 and 100% of the Panicum are destroyed by the application of quantities of active substance varying between 1.25 and 2 kg. per hectare.

The great persistence of this tetrasubstituted urea has made it possible to prevent the successive shooting of Panicum found in the comparison plots, throughout the cultivation season and until harvesting.

*Example 39*

N-phenoxyacetyl-N-(3,4-dichlorophenyl) - N',N' - dimethyl urea is applied during the spring to 5-year old apple trees in orchards and to an 8-year old vineyard, in quantities of 1 to 5 kg. of active substance per hectare, the treatment being applied before the weeds emerge.

Quantities of 2.5 to 5 kg. per hectare have practically prevented any growth of weeds during a period of more than 5 months without harming the fruit trees or the vine.

*Example 40*

N-phenylacetyl-N-(3,4-dichlorophenyl)-N',N'-dimethyl urea is applied in the form of a wettable powder at the rate of 4 kg. of active substance per hectare, admixed with 2.5 kg. of 3-amino-1,2,4-triazole per hectare, the treatment taking place after weeds have shown in a vineyard. The association of the two weed-killers has made it possible to destroy or effectively limit the following species: amaranths, chenopodia, creeping thistle (*Cirsium arvense*), lesser bindweed (*Convolvulus arvensis*) hoary cress (*Lepidium draba*), deadly nightshade, digitaria and setaria.

*Example 41*

The N-(2,4 - dichlorophenoxyacetyl)-N-(3,4-dichlorophenyl)-N'-methoxy-N'-methyl urea is used in the form of a wettable powder with 50% of active substance and is sprayed at the rate of 4 kg. of active substance per hectare, for cleaning garden paths during the month of February. This application has made it possible to prevent the growth of the following species of weeds during the season: scarlet pimpernel (*Anagallis arvensis*), chenopodia, wild radishes, meadow grass (*Poa annua*), geranium, vetches (*Vicia sp.*), and purslane (*Portulaca oleracea*).

*Example 42*

Glass house tests have been carried out with certain substituted ureas according to the invention on wheat, barley, oat, corn, panicum milliaceus, ray-grass, carrot, flax, peas and wild mustard, in order to determine the degrees of phytotoxicity of said ureas in the various plants. The phytotoxicity scale is expressed by numbers from 0 to 5: 0 means there is no toxic action stated, while 5 corresponds to 100% kill of the concerned plant.

The following Tables I to V summarize the results of the tests noted 30 days after treatment.

The vertical columns of Tables I by III give degrees of phytotoxicity for dosage rates applied amounting to respectively 1, 2, 4, and 8 kg. per hectare for each plant; in Tables IV and V the figures are relative to respectively 0.5, 1, 2 and 4 kg. per hectare. On each table the manner of carrying out the tests, i.e. as pre-emergence or post-emergence treatment, is indicated.

The herbicide ureas tested are designated by letters A to H as follows:

A. N-phenylacetyl N-(3,4-dichlorophenyl) N',N'-dimethyl urea
B. N-phenoxyacetyl N-(3,4-dichlorophenyl) N',N'-dimethyl urea
C. N-(2,4-dichlorophenoxyacetyl) N-(4-chlorophenyl) N',N'-dimethyl urea
D. N-(2,4-dichlorophenoxyacetyl) N-(3,4-dichlorophenyl) N',N'-dimethyl urea
E. N-(2,4-dichlorophenoxyacetyl) N-(3,4-dichlorophenyl) N'-methoxy N-methyl urea
F. N-(2,4-5-trichlorophenoxyacetyl) N-(3,4-dichlorophenyl) N',N'-dimethyl urea
G. N-(2-(2,4-dichlorophenoxy) propionyl) N-(3,4-dichlorophenyl) N',N'-dimethyl urea
H. N-(2(2,4,5-trichlorophenoxy) propionyl) N-(3,4-dichlorophenyl) N',N'-dimethyl urea.

TABLE I.—PRE-EMERGENCE TREATMENTS (1-2-4-8 KG./HA.), AFTER SEEDING

| Herbicide | Wheat | | | | Barley | | | | Oat | | | |
|---|---|---|---|---|---|---|---|---|---|---|---|---|
| | 1 | 2 | 4 | 8 | 1 | 2 | 4 | 8 | 1 | 2 | 4 | 8 |
| A | 0 | 0 | 0 | 0.1 | 0 | 0 | 0 | 0.1 | 0 | 0 | 0 | 0.1 |
| B | 0 | 0.5 | 2.2 | 2.2 | 0 | 0.7 | 1.2 | 1.2 | 0 | 0.5 | 2.5 | 2.5 |
| C | 0 | 0 | 0 | 0.5 | 0 | 0 | 0.2 | 0.5 | 0.5 | 0.5 | 1 | 1.5 |
| D | 0 | 0 | 0 | 0 | 0 | 0 | 0 | 0 | 0 | 0 | 0 | 0 |
| E | 1.5 | 2 | 3 | 4 | 0.5 | 1 | 2.5 | 3.5 | 1 | 1.5 | 2.5 | 3.5 |
| F | 0 | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 | 0 |
| H | 0 | 0 | 0 | 0.2 | 0 | 0 | 0 | 0.5 | 0 | 0 | 0 | 0.5 |

TABLE II.—PRE-EMERGENCE TREATMENT, AFTER SEEDING

| Herbicide | Corn | | | | Pan. Miliaceum | | | | Ray-Grass | | | |
|---|---|---|---|---|---|---|---|---|---|---|---|---|
| | 1 | 2 | 4 | 8 | 1 | 2 | 4 | 8 | 1 | 2 | 4 | 8 |
| A | 0 | 0 | 0 | 0.2 | 2.2 | 3.5 | 4.7 | 5 | --- | --- | --- | --- |
| B | 0 | 0 | 3.2 | 3.4 | 5 | 5 | 5 | 5 | 4.9 | 5 | 5 | 5 |
| C | 0 | 0 | 0.5 | 2 | 0.5 | 1 | 1.5 | 3.5 | --- | --- | --- | --- |
| D | 0 | 0 | 0 | 0 | 1 | 2 | 3 | 4.2 | 0 | 0.5 | 3 | 5 |
| E | 4.8 | 5 | 5 | 5 | 5 | 5 | 5 | 5 | 4.8 | 4.8 | 5 | 5 |
| F | 0 | 0 | 0 | 0 | 1.5 | 3 | 4.5 | 5 | 0 | 1.5 | 3 | 5 |
| G | 0 | 0 | 0.5 | 0.5 | 2 | 3 | 4.8 | 5 | 0.5 | 3 | 4.5 | 5 |
| H | 0 | 0 | 0 | 0 | 0 | 0 | 0 | 0.2 | 0 | 0 | 0 | 0 |

TABLE III.—PRE-EMERGENCE, AFTER SEEDING

| Herbicide | Carrot | | | | Flax | | | | Pea | | | |
|---|---|---|---|---|---|---|---|---|---|---|---|---|
| | 1 | 2 | 4 | 8 | 1 | 2 | 4 | 8 | 1 | 2 | 4 | 8 |
| B | 1.5 | 2 | 3 | 3.5 | 1 | 3 | 4.2 | 4.5 | 0 | 0 | 0 | 1 |
| C | 0 | 0.5 | 1 | 1.5 | 0 | 0 | 0.5 | 1.5 | --- | --- | --- | --- |
| D | 0 | 0 | 0.1 | 0.2 | 0 | 0 | 0 | 0 | 0 | 0 | 0 | 0 |
| E | 4.8 | 5 | 5 | 5 | 4.8 | 4.8 | 5 | 5 | 5 | 5 | 5 | 5 |
| F | 0 | 0 | 0 | 0.2 | 0 | 0 | 0 | 0 | 0 | 0 | 0.1 | 0.5 |
| G | 0 | 0 | 0 | 1 | 0 | 0 | 0 | 0 | 0 | 0 | 0.2 | 0 |
| H | 0 | 0 | 0 | 0 | 0 | 0 | 0 | 0 | 0 | 0 | 0 | 0 |

TABLE IV.—POST-EMERGENCE TREATMENTS ON YOUNG PLANTS

| Herbicide | Wheat | | | | Barley | | | | Oat | | | |
|---|---|---|---|---|---|---|---|---|---|---|---|---|
| | 0.5 | 1 | 2 | 4 | 0.5 | 1 | 2 | 4 | 0.5 | 1 | 2 | 4 |
| A | 0 | 0 | 0.1 | 0.2 | 0 | 0 | 0.1 | 1 | 0 | 0 | 0.1 | 1.5 |
| B | 0 | 0 | 0 | 0 | 0 | 0 | 0.2 | 0.5 | 0 | 0 | 0.5 | 1 |

TABLE V.—POST-EMERGENCE TREATMENT ON YOUNG PLANTS

| Herbicide | Corn | | | | Pan. Miliaceum | | | | Wild Mustard | | | |
|---|---|---|---|---|---|---|---|---|---|---|---|---|
| | 0.5 | 1 | 2 | 4 | 0.5 | 1 | 2 | 4 | 0.5 | 1 | 2 | 4 |
| A | 0 | 0.5 | 1.5 | 2.5 | 4.8 | 5 | 5 | 5 | 4.5 | 4.8 | 5 | 5 |
| B | 0 | 0 | 0 | 0.2 | 4.9 | 5 | 5 | 5 | 3 | 3.5 | 4 | 5 |

From the foregoing tables it can be seen that except the "E" compound, which contains a methoxy group, the herbicides tested have selective action on weeds, when applied before emergence in wheat, barley and oat, up to the highest dosage rate of 8 kg./ha. This result is also obtained with corn as concerns the compounds A, C, D, F, G, H. In carrot similar selective results are attained with the herbicides D, F, G and H, while flax and peas may be efficiently and selectively treated, before emergence, by the same D, F, G and H compounds with dosages up to 8 kg./ha.

Concerning *Panicum miliaceum* (millet) and *Lolium italicum* (ray-grass), it is interesting to state that only the product H remains non toxic up to 8 kg./ha., while a strong phytotoxicity appears with B and E even with 1 kg. only per hectare, in pre-emergence treatments.

Another remarkable result is that B has also a strong toxic action upon *Panicum* (Echinochloa) *crus-galli*, as well in dry soil as in water, starting from 0.5 kg./ha.

As to post-emergence treatments (Tables IV and V) they show a very important herbicidal action of compound A versus millet and wild mustard, while this compound is unexpectedly harmless to wheat, barley and oat. Similar properties are exhibited by the herbicide B.

We claim:

1. A process of killing plants comprising applying to the habitat of the plants a herbicidally effective amount of a substituted urea selected from the group which consists of: N-phenylacetyl N-(3,4-dichlorophenyl) N',N'-dimethyl urea; N-phenoxyacetyl N-(3,4-dichlorophenyl) N',N'-dimethyl urea; N-(2,4-dichlorophenoxyacetyl) N-(4-chlorophenyl) N',N'-dimethyl urea; N-(2,4-dichlorophenoxyacetyl) N-(3,4-dichlorophenyl) N',N'-dimethyl urea; N-(2,4-dichlorophenoxyacetyl) N-(3,4-dichlorophenyl) N'-methoxy N-methyl urea; N-(2,4-5-trichlorophenoxyacetyl) N-(3,4-dichlorophenyl) N',N'-dimethyl urea; N-(2-(2,4-dichlorophenoxy)propionyl) N-(3,4-dichlorophenyl) N',N'-dimethyl urea; N-(2(2,4,5-trichlorophenoxy) propionyl) N-(3,4-dichlorophenyl) N',N'-dimethyl urea.

2. A process of killing plants comprising applying to the plants a herbicidal amount of a substituted urea in which at least one and no more than two of the hydrogen atoms bonded to the urea nitrogen atoms are replaced with the grouping

where $n$ is a number from 1 to 3, $R_4$ is selected from the group consisting of hydrogen and methyl, R is phenoxy containing 0 to 3 chlorine atoms as the sole substituent, while 1 to 2 further hydrogen atoms of the hydrogen atoms bonded to the urea nitrogen atoms are replaced by a phenyl group having up to 3 chlorine atoms as the sole substituents.

3. A process of killing plants comprising applying to the plants a herbicidal amount of a substituted urea in which at least one and no more than two of the hydrogen atoms bonded to the urea nitrogen atoms are replaced with the grouping

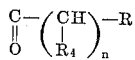

where $n$ is a number from 1 to 3, $R_4$ is selected from the group consisting of hydrogen and methyl, R is phenoxy containing 0 to 3 chlorine atoms as the sole substituents, while 1 to 2 further hydrogen atoms of the hydrogen atoms bonded to the urea nitrogen atoms are replaced by a phenyl group having up to 3 chlorine atoms as the sole substituents, and 1 to 2 of said hydrogen atoms attached to the urea nitrogen atoms are substituted by a lower alkyl group having 1 to 3 carbon atoms.

4. A process of killing plants comprising applying to the habitat of the plants a herbicidal amount of a substituted urea in which at least one and no more than two of the hydrogen atoms bonded to the urea nitrogen atoms are replaced with the grouping

where $n$ is a number from 1 to 3, $R_4$ is selected from the group consisting of hydrogen and methyl, R is the 2,4-dichlorophenoxy group, while 1 to 2 further hydrogen atoms of the hydrogen atoms bonded to the urea nitrogen atoms are replaced by a phenyl group having 1 to 2 chlorine atoms in the 3 and 4 positions as the sole substituents, and 1 to 2 of said hydrogen atoms attached to said urea nitrogen atoms are substituted by an alkyl group having 1 to 3 carbon atoms.

5. A process of killing plants comprising applying to the habitat of the plants a herbicidal amount of a substituted urea in which at least one and no more than two of the hydrogen atoms bonded to the urea nitrogen atoms are replaced with the grouping

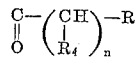

where $n$ is a number from 1 to 3, $R_4$ is selected from the group consisting of hydrogen and methyl, R is phenoxy containing 0 to 3 chlorine atoms as the sole substituents, while 1 to 2 further hydrogen atoms of the hydrogen atoms bonded to the urea nitrogen are replaced by halophenyl having 1 to 3 halogen atoms.

6. A process of killing plants comprising applying to the habitat of the plants a herbicidal amount of a substituted urea in which at least one and no more than two of the hydrogen atoms bonded to the urea nitrogen atoms are replaced with the grouping

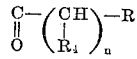

where $n$ is a number from 1 to 3, $R_4$ is selected from the group consisting of hydrogen and methyl, R is phenoxy containing 0 to 3 chlorine atoms as the sole substituents, while 1 to 2 further hydrogen atoms of the hydrogen atoms bonded to the urea nitrogen atoms are replaced by nitrophenyl having up to 1 chlorine substituent on the phenyl group.

7. A process of killing plants comprising applying to the habitat of the plants a herbicidally effective amount of a compound having the formula:

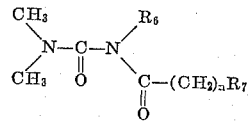

where $n$ is an integer from 1 to 3, $R_6$ is 4-chlorophenyl and $R_7$ is 2,4-dichlorophenoxy.

8. A process of killing plants comprising applying to the habitat of the plants a herbicidally effective amount of a compound having the formula:

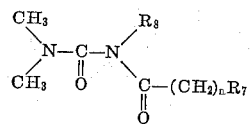

where $n$ is an integer from 1 to 3, $R_8$ is 3, 4-dichlorophenyl and $R_7$ is 2,4-dichlorophenoxy.

References Cited

UNITED STATES PATENTS

| | | | |
|---|---|---|---|
| 2,655,444 | 10/1953 | Todd | 71—2.6 |
| 2,655,446 | 10/1953 | Todd | 71—2.6 |
| 2,663,729 | 12/1953 | Searle et al. | 260—553 |
| 2,999,110 | 9/1961 | Lott et al. | 260—553 |
| 3,000,939 | 11/1961 | Frankel | 260—553 |

OTHER REFERENCES

Beasley et al.: J. Pharm. and Pharmacal., vol. 13 (1961), pp. 694–7.

McNew et al.: Chemical Abstracts, vol. 44 (1950), pp. 9105–6 at 9106e.

Swanson: Chemical Abstracts, vol. 41 (1947), pp. 3912–13.

Thompson et al.: Chemical Abstracts, vol. 41 (1947), pp. 3902–12 at 2903d.

LEWIS GOTTS, *Primary Examiner.*

HENRY R. JILES, NICHOLAS S. RIZZO, ELBERT L. ROBERTS, JAMES O. THOMAS, JR., *Examiners.*

A. J. ADAMCIK, *Assistant Examiner.*